United States Patent [19]
Davis et al.

[11] Patent Number: 5,532,583
[45] Date of Patent: Jul. 2, 1996

[54] SYSTEM AND METHOD FOR CALIBRATING A POSITION SENSING SYSTEM

[75] Inventors: Bruce M. Davis, Longmont; Steven S. Stetler, Firestone; Chester L. Rebman, Longmont, all of Colo.

[73] Assignee: Storage Technology Corporation, Louisville, Colo.

[21] Appl. No.: 56,625

[22] Filed: May 4, 1993

[51] Int. Cl.[6] .......................... G01R 35/00; G01B 7/00; G01B 7/14; H01L 43/06
[52] U.S. Cl. .................. 324/202; 324/207.12; 324/207.2
[58] Field of Search ........................ 324/225, 207.12, 324/251, 207.2, 173, 174, 202, 207.24, 207.25, 207.26; 338/324; 307/309

[56] References Cited

U.S. PATENT DOCUMENTS

| | | | |
|---|---|---|---|
| 4,293,814 | 10/1981 | Boyer | 324/123 |
| 4,687,994 | 8/1987 | Fulkerson et al. | 324/251 |
| 4,873,655 | 10/1989 | Kondraske | 324/207.2 |

*Primary Examiner*—Walter E. Snow
*Attorney, Agent, or Firm*—Sterne, Kessler, Goldstein & Fox

[57] ABSTRACT

A system and method is provided for positioning a take-up reel in a tape drive unit so that a leader block can be inserted therein. The take-up reel is driven by a motor having a rotatable shaft and a motor controller. A position encoder, mounted on the shaft of the motor, uses a Hall-effect device to generate a Hall voltage signal in response to rotational motion of the motor shaft. The Hall voltage signal is amplified to provide a motor phase signal which is then compared to a reference level (usually zero volts) to generate encoder pulses. The encoder pulses are counted using a counter/state machine to determine a position and direction of rotation of the take-up reel. A feature of this system is that it is calibrated using a processor that determines the DC level of the motor phase signal and subsequently adjusts the motor phase signal so that it is substantially symmetrical about the reference level to which it is compared. The microprocessor accomplishes this by measuring a maximum and a minimum value for the motor phase signal, determining the offset about a DC level of the Hall voltage signal using these measured values, and generating a feedback signal to adjust the DC level of said motor phase signal as desired. This calibration is performed for a fixed period of time and only while the motor shaft is rotating. This ensures that actual maximum and minimum signal values are used for the calibration.

14 Claims, 5 Drawing Sheets

SYSTEM AND METHOD FOR CALIBRATING A POSITION SENSING SYSTEM

BACKGROUND OF THE INVENTION

1. Field of the Invention

The present invention relates generally to position sensors, and more specifically to a system and method for positioning an object using a Hall-effect position encoder, and still more specifically to a system and method for calibrating the positioning system.

2. Related Art

Magnetic tape drives are commonplace in today's computer industry. These tape drives are used to store digital information onto magnetic tapes and to subsequently read the stored information. Two examples of a magnetic tape drive are the IBM 3480 tape drive available from International Business Machines in Armonk, N.Y. and the StorageTek 4480 tape drive available from Storage Technology Corporation in Louisville, Colo. Another example is the AJ-D350 digital video tape recorder available from Panasonic Broadcast System Company in Secaucus, N.J.

Magnetic tapes are typically available in two common formats: the cassette and the cartridge. The cassette tape is a two-reel mechanism that includes a supply reel and a take-up reel. Cassette tape drives thread the magnetic tape along a transport path, past one or more magnetic transducer heads, and then transport the tape such that it travels along the transport path. The tape is taken from the supply reel and wound onto the take-up reel. For tape drives capable of operating in a forward and reverse direction, the take-up reel and the supply reel exchange "functions" when the direction is reversed.

For cartridge tapes, the take-up reel is external to the tape cartridge and is typically provided internal to the tape drive. When a cartridge is inserted into a tape drive, it is threaded along the transport path. The threading is accomplished as follows: an extractor arm "grasps" a leader block at the free end of the tape. The extractor arm pulls the tape by the leader block along the transport path past one or more magnetic transducer heads, idler arms, capstans, and the like. At the end of the threading operation, the tape leader block is inserted in a key in the take-up reel. Once this is accomplished, the tape can be transported along the transport path and read/write operations can take place.

To allow the cartridge tape leader block to be inserted in the take-up reel, the take-up reel must be positioned, or indexed, so that a key for accepting the leader block is aligned properly. One conventional technique for indexing the take-up reel is a mechanical system that employs a solenoid and a latch mechanism to align the take-up reel. This technique requires that mechanical hardware be attached to the take-up reel motor. This technique is often unreliable as it relies heavily on mechanical techniques. For example, large solenoids are often used which tend to wear more quickly than electronic components.

Another conventional technique for positioning a reel uses a position encoder to sense and indicate rotation of the motor shaft. One such position encoder uses Hall-effect devices to sense the movement of magnetized areas on the motor shaft. The Hall-effect device provides a phase and quadrature signal indicating speed and displacement of the motor shaft. These signals have an AC component that varies about a DC offset level. The AC component varies as a function of position. For example, the AC component may be a sinusoid, where each period of the sine wave indicates a certain amount of shaft displacement. To position the reel, a controller determines the actual position based on position encoder signals and moves the motor to position the wheel to the desired position.

Because the Hall-effect device has a DC offset level, conventional systems calibrate the output of the Hall-effect device to remove this offset or to adjust it to a predetermined level. It appears that conventional systems perform the calibration continuously. As a result, an incorrect offset level can be determined. This occurs when the motor stops turning the take up reel. The motor may stop at a point where the output of the Hall-effect device may be above or below the DC offset level. If this occurs, the calibration technique corrects for this non-DC level and not for the actual DC offset level. This results in a mis-calibration of the system. This problem is not limited to position encoders using Hall-effect devices but may arise in other positioning systems that provide signals that vary about a DC level.

What is needed is a reliable technique for indexing the take-up reel such that leader block insertion can be accomplished. What is further needed is a solution for determining an offset voltage of a position encoder and Hall effect device and calibrating the system for that offset voltage.

SUMMARY OF THE INVENTION

The present invention is directed toward a system and method for positioning an object to a desired position and for calibrating the positioning system. Specifically, the present invention is directed to a system and method for positioning a take-up reel of a magnetic tape drive so that a leader block can be inserted therein. The take-up reel is rotated using a motor.

An actual position of the object is determined using a position encoder that utilizes a Hall-effect device to provide position information. The output of the Hall-effect device is a Hall-effect signal that is a sinusoidal or like signal that varies about a DC level. Signals generated by the Hall-effect device are phase and quadrature signals that provide position and direction of rotation information.

The Hall-effect signals (phase and quadrature) are amplified to raise them to a usable level. Each amplified signal is compared to a reference voltage level in a comparator to detect signal level swings about the reference voltage level. The resultant comparator output is a series of encoder pulses that are input to a counter and a state machine. The counter and state machine are used to determine position and direction of motion information.

Because the Hall-effect signal has an associated DC offset, there is the possibility that the comparator may not accurately detect the signal level swings and generate encoder pulses. Further, because the offset level varies with changing conditions, a simple one-time correction is potentially ineffective. To compensate for changes in the offset level, the present invention provides a calibration technique whereby the signal input to the comparator is adjusted so that signal level swings about the reference voltage level can be detected without interference from changes in the DC offset level of the Hall-effect signal.

According to the present invention, the calibration is performed only during a fixed period of time during which the motor is rotating. Because of this, calibration errors are less likely to occur. This is a distinct advantage over continuous calibration systems that may allow a calibration to occur while the motor is not moving. In these continuous calibration systems, if a calibration occurs while the motor is not moving and the Hall-effect signal is not at the DC level, the amplified signal would be improperly adjusted. Because the present invention always ensures that the motor is moving while the calibration is taking place, the calibration is based on actual maximum, minimum and DC values.

The present invention uses a processor to control the calibration. The processor allows the object to move for a fixed time period, thereby allowing a shaft of the positioning motor to rotate during this time. The processor measures the maximum and minimum values of the amplified signal to determine the DC level of that signal. The processor then generates a feedback signal to adjust the level of the amplified signal to bring the DC level to a desired level. The feedback signal is a digital signal that is converted to an analog voltage level. This analog voltage level is provided to adjust the level of the amplified signal that is fed to the comparator.

Because the characteristics of the amplifier are known, the processor can determine the proper analog voltage level required to adjust the amplified signal. The processor adjusts the digital value of its feedback signal so that this proper analog voltage level is obtained.

Once the system is calibrated, the processor uses position and direction of rotation information from the counter/state machine to detect an actual position. This information is compared to a desired position. The processor then generates an appropriate motor control signal to drive the motor to the desired position.

Further features and advantages of the present invention, as well as the structure and operation of various embodiments of the present invention, are described in detail below with reference to the accompanying drawings.

BRIEF DESCRIPTION OF THE DRAWING

The present invention will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

1. Introduction

The present invention provides a system and method for indexing a take-up reel for leader block insertion. The invention uses a Hall-effect device to generate position information and an elegant and unique calibration system and method to compensate for initial DC offset and offset drift associated with the Hall-effect device.

The invention is not limited to the specific case of indexing a take-up reel, but can be applied to a wide array of applications wherein an object is positioned using a position sensor. Although the invention is described in terms of the specific example of positioning a take-up reel, it would be apparent to a person skilled in the relevant art how the invention may be implemented in positioning various other objects such as robot arms, antenna mounts and the like.

The present invention is not limited to applications using Hall-effect positioning systems, but can be applied to other types of positioning systems that require similar calibration. Also, although the invention is described in terms of sensing position based on a rotating shaft, it can also be implemented with other position sensor types such as linear position sensors.

2. Closed Loop Positioning System

Figure 1:
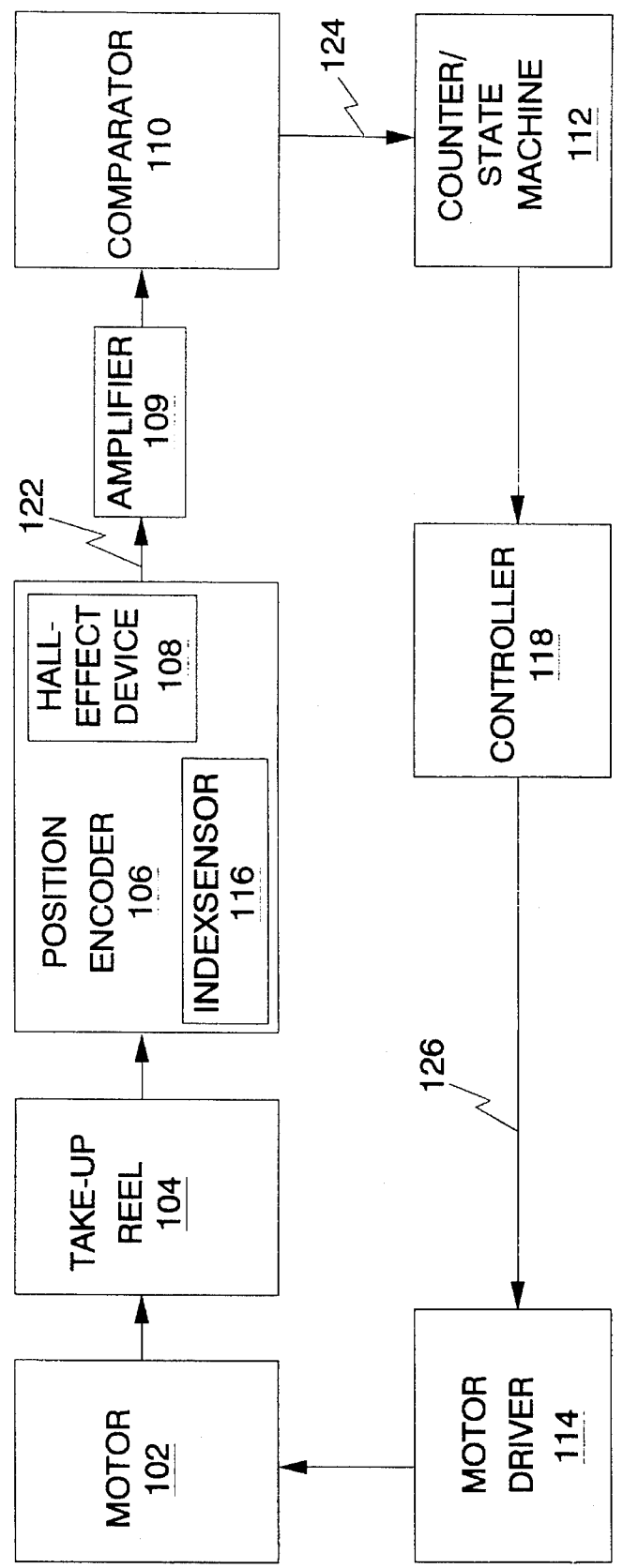
FIG. 1 is a block diagram illustrating a closed loop positioning system for positioning an object to a known position.

FIG. 1 is a block diagram illustrating a simple closed loop positioning system 100 according to a preferred embodiment. Referring to FIG. 1, a take up reel motor 102 within the tape drive rotates a take-up reel 104. More specifically, a shaft of motor 102 directly or indirectly (via gears or belts) imparts rotational forces to a spindle of take-up reel 104.

A position encoder 106 is provided to sense and indicate the position of the shaft. Position encoder 106 includes a ring magnet located on the shaft of the take-up reel motor 102. As the shaft and ring magnet rotate, a Hall-effect device senses the magnetic fields and produces phase and quadrature signals 122. These phase and quadrature signals have an AC component (e.g., sinusoidal or like signal) that varies about a DC level and are referred to as Hall voltages 122. The AC component varies as a function of rotation of the motor shaft. Thus, Hall voltage 122 can be used to compute direction of rotation and angular displacement of the shaft. Position encoders 104 and Hall-effect devices 106 are well known in the art. For example, see U.S. Pat. No. 4,959,797 to McIntosh and U.S. Pat. No. 4,891,764 to McIntosh.

An index sensor 116 is provided in conjunction with position encoder 106 to indicate proper alignment of the take-up reel to accept the leader block. Position encoder 106 only provides relative position information such as signals that indicate that the shaft is rotating and a direction of rotation. Index sensor 116 allows the position encoder 106 to provide position information relative to an index position. From this, absolute (rather than relative) position information can be determined. This enables the use of the position encoders 106 to index the take-up reel to a desired position.

A comparator 110 detects the presence of phase and quadrature signal levels which are above and/or below the DC. Comparator 110 outputs encoder pulses 124 in response to Hall voltage 122. A counter/state machine 112 counts encoder pulses 124 to determine the speed and direction of rotation of take-up reel 104. Counter/state machine 112 converts the pattern of pulses received from comparator 110 into position and rotation information that can be used by controller 118.

Based on the position and direction information and based on a known desired position of take-up reel 104, a controller (typically a digital processor) 118 generates a motor control signal 126 to alter the rotation of the shaft of motor 102. Motor control signal 126 is sent to a motor driver 114 which adjusts the amount of current (or voltage in a voltage controlled embodiment) supplied to motor 102 thereby adjusting the position of take-up reel 104.

To use position encoder 106 for closed loop positioning, Hall-effect device 108 is typically DC-coupled through a relatively high gain amplifier 109 to provide the position information to comparator 110. Because Hall-effect device 108 requires an initial DC bias for operation, it has an associated offset. This offset varies from device to device and with time and temperature. Further, the inventors have discovered that the offset of Hall-effect device 108 also varies as the speed of take-up reel motor 102, and hence take-up reel 104, changes.

Changes in offset are amplified by amplifier 109 and can ultimately lead to clipping or loss of signal detectability. For example, if the offset causes the signal to always be above the comparator threshold, comparator 110 will not output discrete encoder pulses 124. Consequently, offset variations can cause loss of counts and therefore loss of position information.

An additional problem caused by offsets is that initial offset and offset drift associated with Hall-effect device 108 lead to calibration and alignment changes over time.

3. Offset Calibration

To compensate for the problems associated with Hall-effect device offset, the present invention provides a unique calibration system and method. The calibration system determines the amount of Hall-effect offset (which is a DC value of the Hall voltage 122) and uses a feedback loop to drive the DC value of the output of amplifier 109 to zero (or some other predetermined level), thus compensating for offset.

As described above with reference to FIG. 1, Hall voltage 122 is amplified by amplifier 109 to produce an amplified signal that is input to comparator 110. Comparator 110 compares this amplified signal to a reference voltage level and generates encoder pulses 124 for voltage swings above and below the reference voltage level. To calibrate the system, it is necessary to determine the DC offset of Hall voltage 122 as manifested in the amplified signal and to calibrate the system such that the DC offset input to comparator 110 is approximately equal to the level of the reference voltage signal. This allows comparator 110 to produce a rectangular pulse train (encoder pulses 124).

Figure 2:
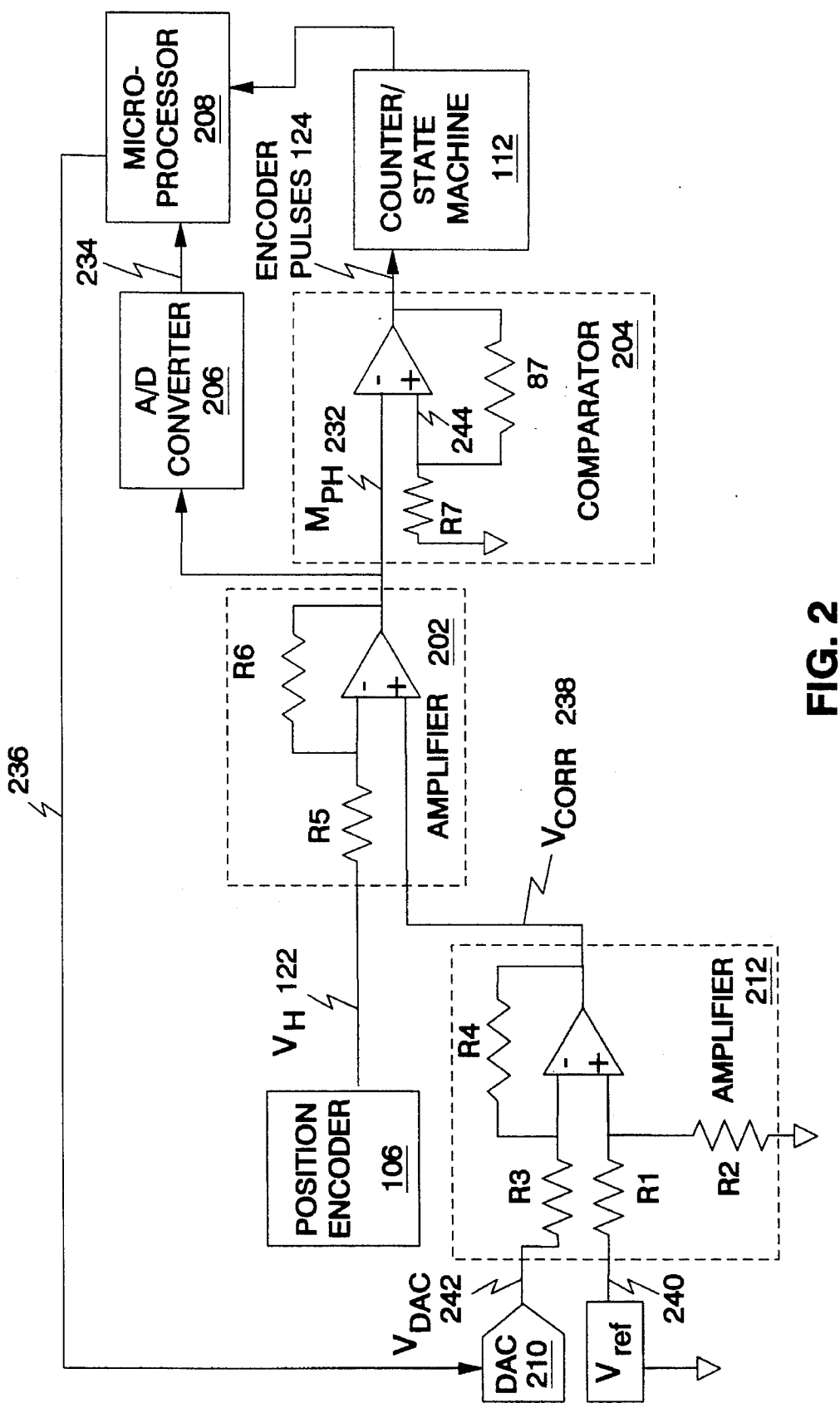
FIG. 2 is a circuit diagram illustrating a calibration system according to a preferred embodiment used to adjust the DC level of a motor phase signal.

FIG. 2 is a schematic diagram illustrating an embodiment of such a calibration circuit used in conjunction with closed loop positioning system 100. FIG. 2 illustrates only circuitry needed for the phase output of Hall-effect device 108. In practice, this circuitry would be duplicated to handle the quadrature signals as well, as would be apparent to a person skilled in the relevant art.

According to this embodiment, Hall voltage 122 (abbreviated VH) is amplified by amplifier 202. Amplifier 202 is an example implementation of amplifier 109. The output of amplifier 202 is a motor phase signal 232. Motor phase signal 232 is illustrated as $M_{PH}$ 232. The DC offset level in Hall voltage 122 is manifested in motor phase signal 232 as a second DC offset level.

Motor phase signal 232 is provided to a comparator 204. Comparator 204 compares motor phase signal 232 with a reference voltage level 244 to generate encoder pulses 124. Comparator 204 is an example implementation of comparator 110. Both amplifier 202 and comparator 204 are shown as being implemented using operational amplifiers with associated feedback biasing resistors. Other equivalent implementations would be apparent to a person skilled in the relevant art.

For quadrature signals, motor phase signal 232 would actually be a motor quadrature signal. The term "motor signal" will be used to generally describe either or both motor phase signal 232 and/or the motor quadrature signal.

Counter/state machine 112 counts encoder pulses 124 to determine a position and uses encoder pulses to determine a direction of rotation of motor 102. As implemented, the system produces both phase and quadrature signals that are processed by counter/state machine 112 to produce one clock pulse plus a direction bit for each edge of the phase or quadrature signals. This effectively quadruples the resolution of the encoder signal. In a preferred embodiment, the encoder has 312 lines per revolution which are processed to give 1,248 lines per revolution of resolution.

A/D converter 206 converts motor phase signal 232 to a digitized phase signal 234. Digitized phase signal 234 is fed to a microprocessor 208. Microprocessor 208 uses digitized phase signal 234 to adjust the value of motor phase signal 232 via feedback loop 236.

Figure 3:
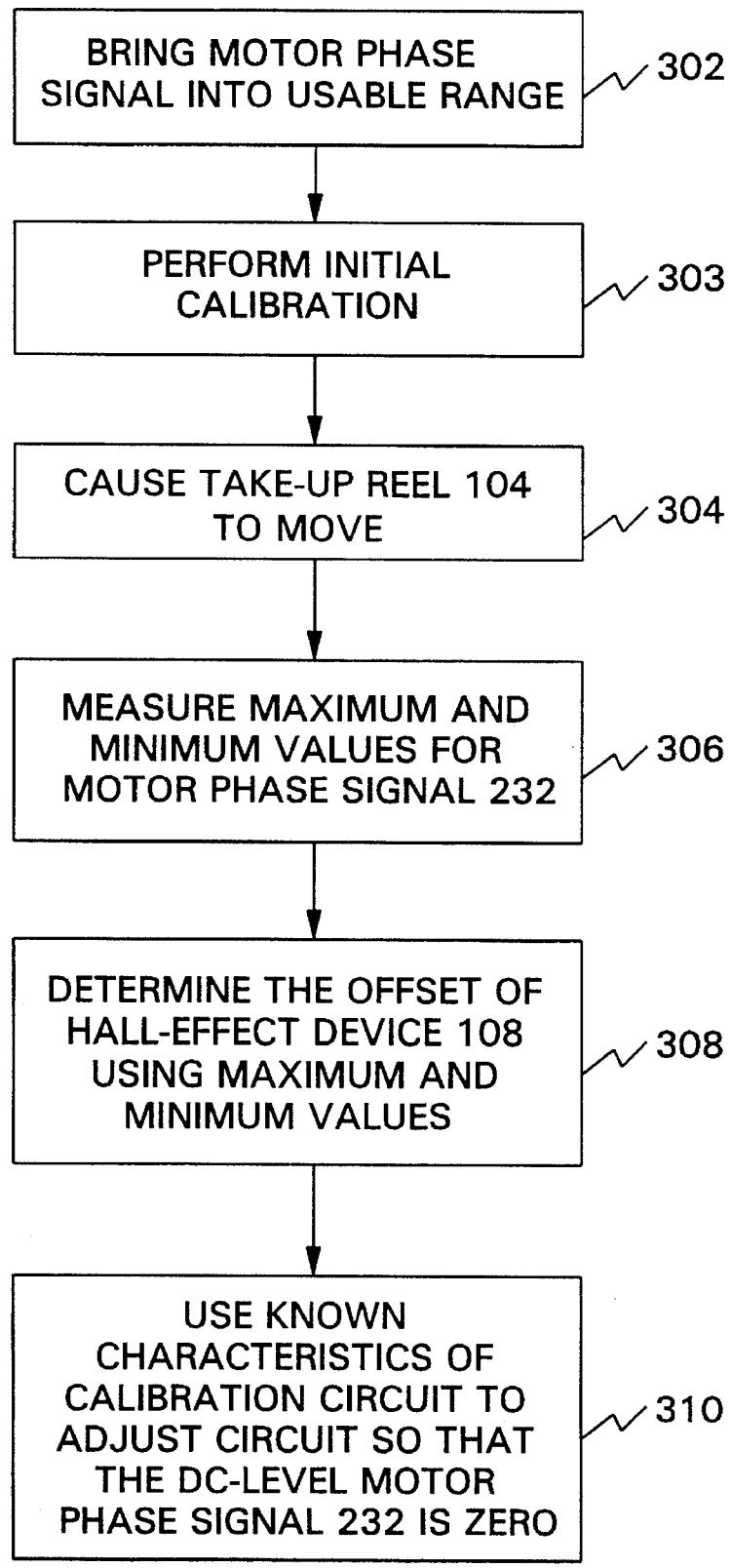
FIG. 3 is a flow chart illustrating the steps followed in adjusting the DC level of the motor phase signal.

FIG. 3 is a flow chart illustrating the steps followed in performing a system calibration. Referring to FIGS. 2 and 3, the calibration technique will now be described.

In a step 302, the system first brings motor phase signal 232 into a usable range by successive approximation techniques. The usable range is a level that does not overdrive A/D converter 206 or cause amplifier 202 to clip. Microprocessor 208 accomplishes this by supplying a digital feedback signal 236 to digital-to-analog converter 210. Digital feedback signal 236 affects analog control voltage ($V_{DAC}$) 242 which ultimately adjusts the level of motor phase signal 232 via amplifier 202 and an amplifier 212. Successive appropriation techniques are known to persons skilled in the relevant art.

Figure 4:
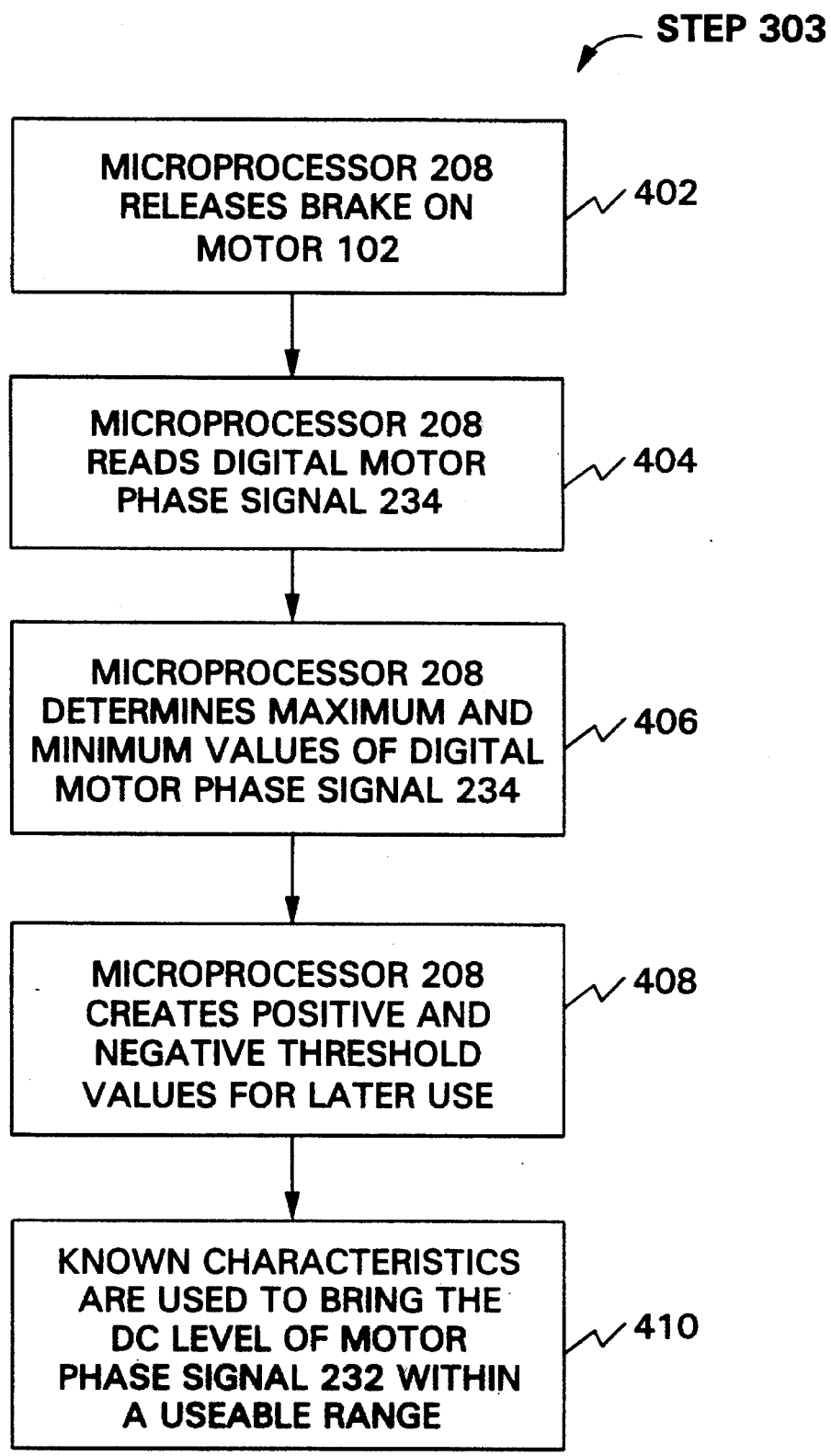
FIG. 4 is a flow chart illustrating a method by which an initial calibration may be performed.

In a step 303, the system performs an initial calibration. FIG. 4 illustrates a manner by which microprocessor 208 may determine the value of digital feedback signal 236 for this initial calibration. Referring to FIG. 4, in a step 402, microprocessor 208 uses a brake on motor 102 to impact rotational forces on the motor-shaft, or otherwise causes the motor to turn for a fixed period of time. In a step 404, microprocessor 208 reads digital motor phase signal 234.

In a step 406, microprocessor 208 determines absolute maximum and minimum values of digital motor phase signal 234. The values are only measured for the time during which the brake is released and the shaft of motor 102 is rotating.

In a step 408, microprocessor 208 uses these maximum and minimum values to create positive and negative threshold values for later use.

In a step 410, known characteristics of the calibration circuit are used to adjust the circuit so that the DC-level of motor phase signal 232 is within a useable range. This is accomplished by adjusting digital feedback signal 236.

Once motor phase signal 232 is within this usable range, the calibration system then fine-tunes motor phase signal 232 to an optimum value, as described below.

Figure 5:
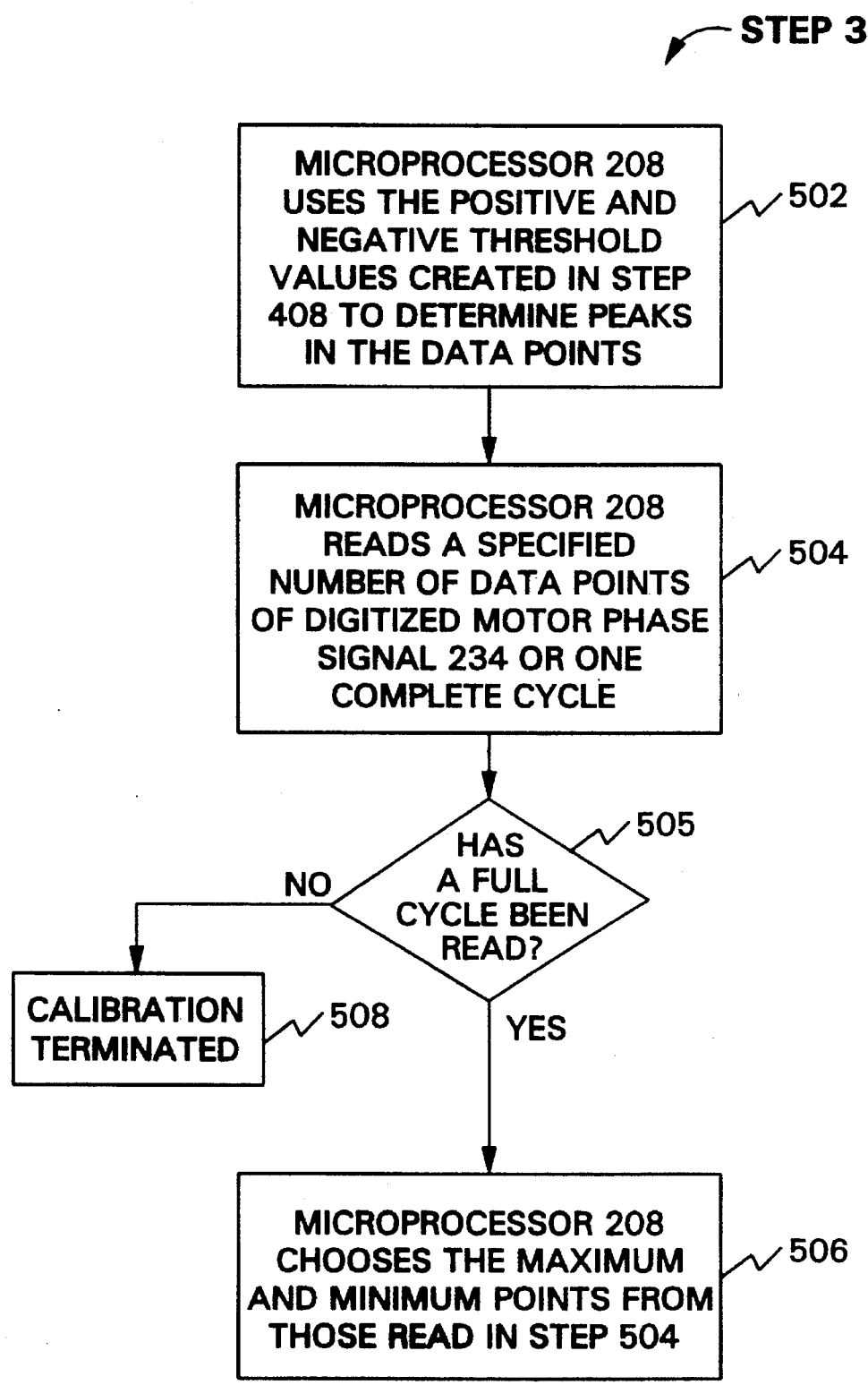
FIG. 5 is a flow chart illustrating a method by which maximum and minimum values of a motor signal may be determined.

Referring again to FIG. 3, in a step 304, microprocessor 208 causes take-up reel motor 102 to move, thus moving take-up reel 104. This motion can be caused by releasing the brake, by using the brake to impart rotational force on the shaft, rotating the reel with motor 102, or by some other like technique. As take-up reel 104 moves, Hall-effect device 108 produces Hall voltage 122. In a step 306, as motor 102 is moving, microprocessor 208 determines maximum and minimum signal values for motor phase signal 232. This determination is made using digital motor phase signal 234. In one embodiment, this is accomplished as illustrated in FIG. 5. Referring to FIG. 5, in a step 502, microprocessor 208 uses the positive and negative threshold values created in step 408 to determine peaks of the data points.

In a step 504, microprocessor 208 then reads a specified number of data points or a compete cycle of digital motor phase signal 234, whichever occurs first. If the magnitude of digital motor phase signal 234 exceeds the positive threshold three times or the negative threshold three times, a full cycle has been read. If a full cycle has not been read by the time the specified number of data points is read, the calibration is preferably terminated. This is illustrated by decision block 505 and block 508. If a full cycle has been read, microprocessor 208 then chooses the maximum and minimum points from this reading in a step 506.

Referring again to FIG. 3, in a step 308, microprocessor 208 calculates the offset of Hall-effect device 108 as manifested in motor phase signal 232 using the maximum and minimum values for the motor phase signal as determined in step 306 (FIG. 5).

In a step 310, once the actual offset is determined, microprocessor 208 uses known characteristics of the calibration circuit to calculate a value for digital-to-analog converter 210 that will make motor phase signal 232 symmetrical about a specified level. This specified level is zero (0) volts in the preferred embodiment. According to the preferred embodiment described below, this is accomplished to within about five percent.

As discussed above, in step 310, digital-to-analog converter 210 is controlled via feedback signal 236 to adjust the level of motor phase signal 232. A change in analog control voltage ($V_{DAC}$) 242 changes the level of correction voltage signal 238. Correction voltage signal 238 is given in Equation (1).

$$V_{CORR} = \frac{R_2}{R_1+R_2} \left( 1 + \frac{R_4}{R_3} \right) V_{REF} - \frac{R_4}{R_3} V_{DAC} \quad (1)$$

A reference voltage ($V_{REF}$) 240 is also provided to adjust the level of correction voltage 238. Resistors $R_1$ and $R_2$ can be used to scale reference voltage 240 to bring it into a range that is compatible with analog control voltage 242.

Motor phase signal 232 is generated by amplifying the difference between voltage correction signal 238 and Hall voltage signal 122 in amplifier 202. Thus, motor phase signal 232 can be described in terms of voltage correction signal 238 and Hall voltage signal 122 as shown in Equation (2).

$$M_{PH} = \left( 1 + \frac{R_6}{R_5} \right) V_{CORR} - \frac{R_6}{R_5} V_H \quad (2)$$

Equations (1) and (2) represent known relationships in the circuit for known values of $R_1$ through $R_6$.

Because digital-to-analog converter 210 is controlled by microprocessor 208, microprocessor 208 can control analog control voltage 242 to a known value. Since the value of reference voltage 240 is known and the value of analog control voltage 242 is known, Hall voltage 122 can be computed using Equations (1) and (2). Solving Equations (1) and (2) for Hall voltage 122 is shown by Equation (3).

$$V_H = \frac{R_5}{R_6} \left[ \left( 1 + \frac{R_6}{R_5} \right) V_{CORR} - M_{PH} \right] \quad (3)$$

Once Hall voltage 122 is known, the required voltage out of digital-to-analog converter 210 to drive motor phase voltage 232 to zero, substituting the value of correction voltage 238 back into Equation (1), and solving for analog correction voltage 242. This calculation is illustrated in Equations (4) and (5).

$$V_{CORR} = \frac{\frac{R_6}{R_5}}{1 + \frac{R_6}{R_5}} V_H = \left( \frac{R_6}{R_5+R_6} \right) V_H \quad (4)$$

$$V_{DAC} = \frac{R_3}{R_4} \left[ \frac{R_2}{R_1+R_2} \left( 1 + \frac{R_4}{R_3} \right) V_{REF} - V_{CORR} \right] \quad (5)$$

Once this value of analog control voltage ($V_{DAC}$) 242 is calculated using Equation (5), microprocessor 208 controls digital-to-analog converter via digital feedback signal 236 to produce this output and bring motor phase signal 232 to zero. The results can be verified by measuring digitized phase signal 234.

In a preferred embodiment, the values read by microprocessor 208 and the values written to digital-to-analog converter 210 are binary integer values. Floating point operations are not used. Actual voltages therefore are not known or computed by the system. Using integer arithmetic simplifies and speeds the operation of microprocessor 208.

The calibration system and method disclosed herein performs the calibration for a discrete time interval (actually for the time that motor 102 is allowed to move by microprocessor 208 as described with reference to step 304). An advantage inherent in this technique is that the calibration is not occurring continuously. For conventional systems that calibrate continuously, an erroneous calibration may occur when the motor shaft stops rotating. If the shaft stops at a point where Hall voltage 122 is not at the DC level, the system will calibrate such that this level is adjusted to zero (or some other predetermined level). Once this occurs, when the shaft again begins to rotate, it's phase and quadrature signals will be improperly interpreted until the calibration can once again correct for the true offset.

The calibration, as set forth above, brings the Hall effect encoder signal into a range that drives counter/state machine 112 reliably. Additionally, an acceptable peak-to-peak value of the amplified phase and quadrature signals is determined. This value can be compared to a fixed standard to ensure that these signals are within an acceptable range.

Once the acceptable peak-to-peak value is known, the system can determine if motor 102 is moving. This is accomplished by periodically monitoring the phase and quadrature signals over an interval that is long enough to guarantee acquiring at least 2.5 cycles. It is also possible to monitor counter/state machine 112 to check for a count change over a given time interval.

These operations are important because if motor 102 is spinning too fast, the signal offset changes. Such a change can result in a loss of detectability of the signals. Therefore, data acquisition sample rate and sample interval as well as the periodic rate of calibration are all important parameters. If the calibration interval is too long, speed-induced offset changes can result in the loss of detectability.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for positioning an object at a desired position, comprising:

a position sensor providing a first signal having a first DC offset level and an AC component, wherein said AC component varies as a function of the position of the object;

an amplifier, coupled to said position sensor, configured to receive the first signal and a second signal and to produce an amplified signal at an output thereof, wherein said amplified signal is substantially proportional to a difference between said first and second signals;

calibration means, coupled to said amplifier, for receiving said amplified signal, for determining a magnitude of said DC offset level as manifested in said amplified signal, and for producing said second signal, wherein said second signal is chosen such that the DC level manifested in said amplified signal is set to a predetermined level;

a comparator, coupled to said amplifier, configured to receive said amplified signal and to produce pulses representing a difference between said amplified signal and a reference voltage level; and controller means, coupled to said comparator, for using said pulses to determine the position of the object, and to produce a control signal to a motor to adjust the position of the object.

2. The system of claim 1, wherein said controller means comprises:

a counter, coupled to said comparator, for counting said pulses produced by said comparator; and a controller, coupled to said counter, configured to determine an actual position of the object based on the number of pulses counted, and to produce said control signal as a difference between said actual position and the desired position.

3. The system of claim 2, wherein said controller means further comprises a state machine, coupled to said comparator, configured to receive said pulses and to determine a direction of motion of the object based on said pulses.

4. The system of claim 1, wherein said calibration means comprises:

an analog-to-digital converter, coupled to said amplifier, configured to convert said amplified signal into a digitized amplified signal;

a processor, having an input coupled to said analog-to-digital converter to receive said digitized amplified signal, configured to produce a digital feedback signal, wherein said digital feedback signal is substantially proportional to the magnitude of said DC offset manifested in said amplified signal; and a digital-to-analog converter, coupled to said processor, configured to produce said second signal in response to said digital feedback signal.

5. The system of claim 1, wherein said calibration means further comprises means for ensuring that the object is in motion while said determination is taking place to thereby avoid an erroneous determination of said magnitude of said DC offset.

6. The system of claim 1, wherein said amplifier comprises:

a first amplifier, coupled to said calibration means, configured to amplify said second signal to produce a third signal; and a second amplifier, coupled to the position sensor, configured to receive said first signal and said third signal, and to amplify the difference between said first signal and said third signal to produce said amplified signal.

7. The system of claim 6, wherein said first amplifier is further configured to receive a reference voltage signal, and to produce said third signal as an amplified difference between said second signal and said reference voltage signal.

8. A method of calibrating a system for determining the position of an object, the system having a position encoder device that provides a first signal having a DC component and an AC component, comprising the steps of:

(a) amplifying the first signal to obtain an amplified first signal, said amplified first signal having an amplified DC component and an amplified AC component;

(b) measuring a plurality of values of said amplified first signal;

(c) determining maximum and minimum values of said amplified first signal from said plurality of values;

(d) determining a level of said amplified DC component of said amplified first signal, said determination based on the maximum and minimum values determined in said step (c), said step (d) further comprising the steps of:

(i) determining a correct voltage level required to adjust said amplified DC component of said amplified first signal to a level that will allow a comparator to detect the presence of pulses above and below said level of the DC component; and (ii) generating a feedback signal to provide said correct voltage level determined in said step (i); and (e) adjusting said amplified DC component of said amplified first signal to a predetermined level in response to said level determined in said step, (d), said adjustment made based on known characteristics of said amplifier.

9. The method of claim 8, further comprising the step of allowing the object to move for a fixed period of time, and wherein said step (c) is performed only while the object is in motion.

10. The method of claim 8, further comprising the step of adjusting said amplified signal to a usable range using approximation techniques.

11. The method of claim 8, further comprising the step of using the maximum and minimum values determined in said step (c) to calculate positive and negative thresholds.

12. The method of claim 11, further comprising the steps of using the positive and negative thresholds to determine peaks in said amplified signal.

13. The method of claim 10, wherein said feedback signal is a digital feedback signal and said step (d) further comprises the step of converting said digital feedback signal into an analog feedback signal.

14. A system for calibrating a position encoder device used for determining the position of an object, the position encoder device providing a first signal having a DC component and an AC component, the system comprising:

means for amplifying the first signal to obtain an amplified first signal, said amplified first signal having an amplified DC component and an amplified AC component;

means for measuring a plurality of values of said amplified first signal;

means for determining maximum and minimum values of said amplified first signal from said plurality of values;

means for determining a level of said amplified DC component of said amplified first signal, said determination based on said determined maximum and minimum values, said means for determining further comprising:

means for determining a correct voltage level required to adjust said amplified DC component of said amplified first signal to a level that will allow a comparator to detect the presence of pulses above and below said level of the DC component, and means for generating a feedback signal to provide said correct voltage level; and means for adjusting said amplified DC component of said amplified first signal to a predetermined level in response to said determined level, said adjustment made based on known characteristics of said amplifier.

* * * * *